April 19, 1955   J. D. LUTSCHG   2,706,337
TRIGONOMETRICAL INSTRUMENT
Filed Nov. 3, 1953   2 Sheets-Sheet 1
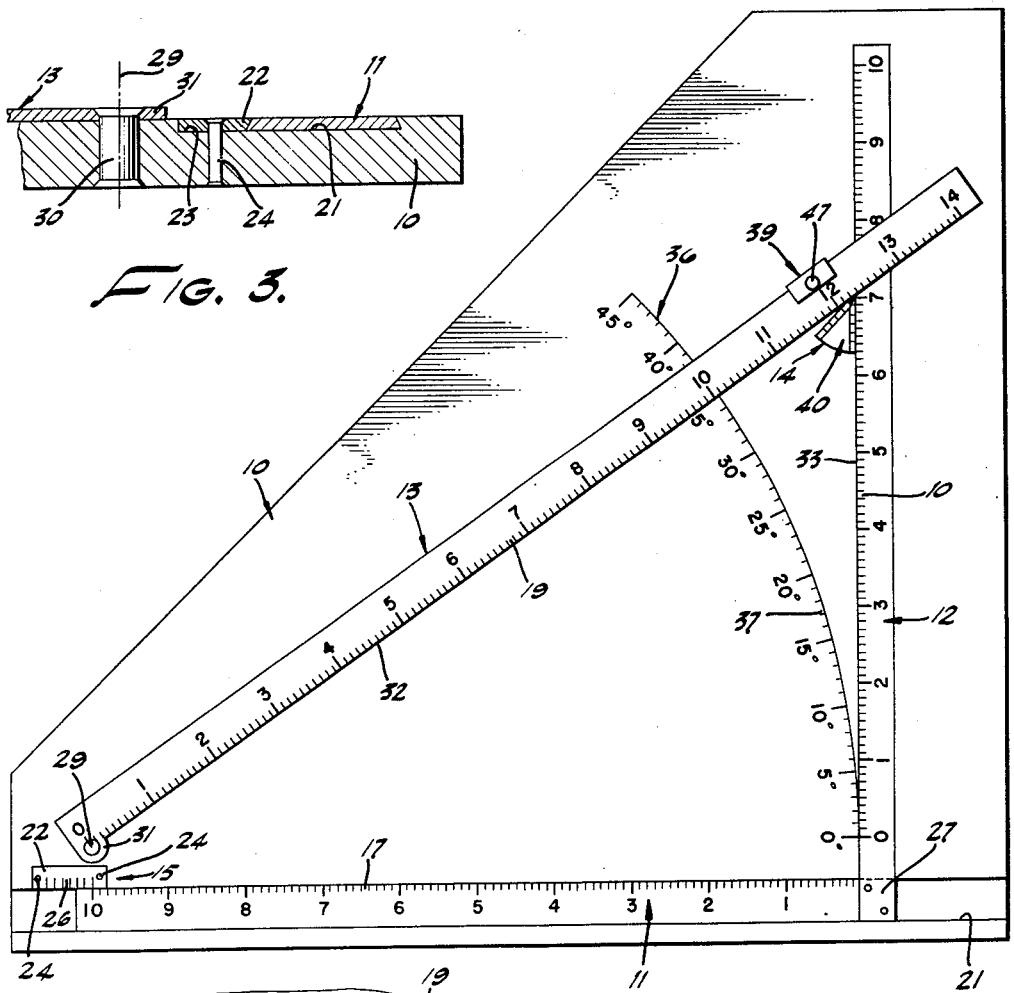
JERROLD D. LUTSCHG
INVENTOR.
BY
ATTORNEYS

JERROLD D. LUTSCHG
INVENTOR.

United States Patent Office 2,706,337
Patented Apr. 19, 1955

2,706,337

TRIGONOMETRICAL INSTRUMENT

Jerrold D. Lutschg, Burbank, Calif.

Application November 3, 1953, Serial No. 389,957

5 Claims. (Cl. 33—97)

This invention relates to a trigonometrical instrument or device adapted to solve a plane right triangle, and also to determine the sine or tangent of an angle, with extreme accuracy.

It is common experience that machinists and the like, while at work in a machine shop, are frequently called upon to solve right triangles and to determine the sine or tangent of an angle. When such an occasion arises the machinist must consult a trigonometry table or book and may be required to carry out mathematical calculations, which is highly undesirable for several reasons. In the first place, the machinist may be in the process of performing a mechanical operation, and it is highly annoying and time-consuming for him to stop, consult a book, and delve in trigonometry. Furthermore, many machinists are years removed from their school days and are not adept at performing the requisite calculations, so that much time is lost and errors frequently result. This is especially true when the job in question requires extreme accuracy, for example when the solution must be to the third or fourth decimal place.

In view of the above factors characteristic of the use of trigonometry in machine shop practice, it is an object of the present invention to provide a trigonometrical device adapted to solve a right triangle and also to compute the sine or tangent of an angle, all to the third or fourth decimal place.

It is another object of the invention to provide novel vernier means for determining, to the third or fourth decimal place, scale readings at the point of intersection of hypotenuse and altitude components of the trigonometrical device.

A further object of the invention is to provide a vernier slidably and pivotally associated with one of two intersecting scales for cooperation with either of the intersecting scales at the point of intersection.

An additional object of the invention is to provide novel means for constructing and mounting vernier elements so that their respective scales will be flush with the scales of the three intersecting and overlapping side rules of the trigonometrical device.

These and other objects and advantages of the invention will be more fully set forth in the following specification and claims considered in connection with the attached drawings to which they relate.

In the drawings:

Figure 1 is a top plan view of the trigonometrical device, showing the relationship between the triangle side portions and the vernier elements;

Figure 2 is a greatly enlarged fragmentary plan view of the pivotal mounting for the hypotenuse rule, and of the vernier for determining the exact position of the base rule;

Figure 3 is a sectional view taken along line 3—3 of Figure 2;

Figures 4, 5:
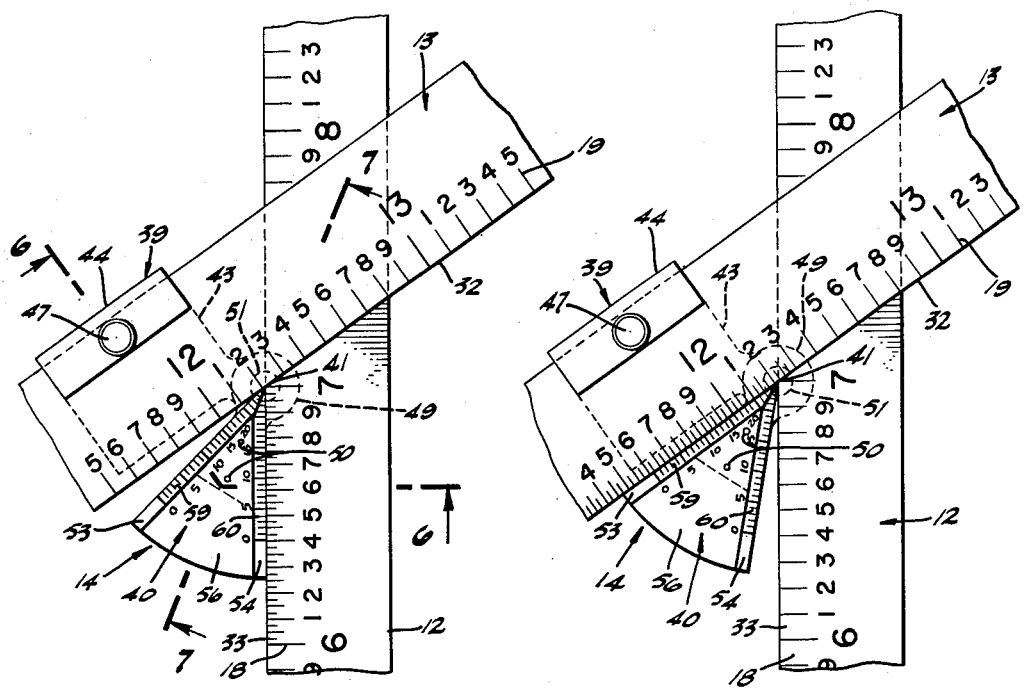
Figure 4 is a greatly enlarged fragmentary plan view of the region of intersection of the hypotenuse and altitude rules shown in Figure 1, and illustrating the intersection vernier in the pivoted position adapted to determine the location of the intersection point on the altitude scale.
Figure 6:
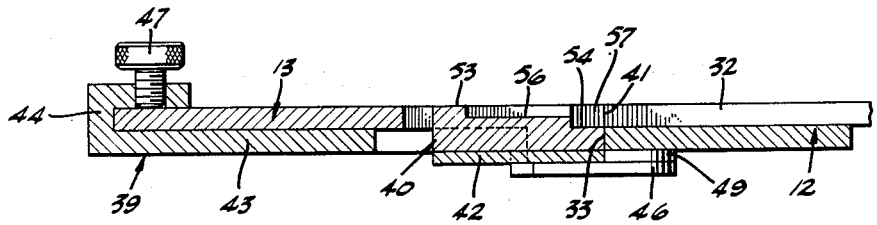
Figure 7:
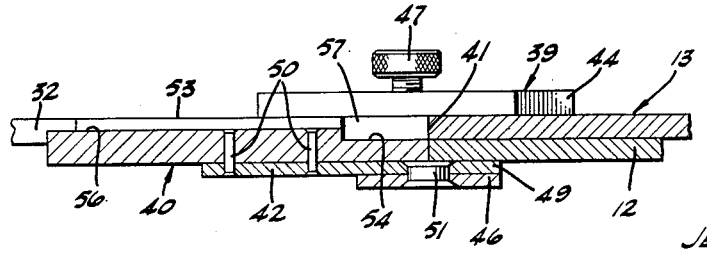

Figure 5 corresponds to Figure 4 but shows the intersection vernier pivoted to determine the location of the intersection point on the hypotenuse scale;

Figure 6 is an enlarged sectional view taken along the broken line 6—6 of Figure 4, and showing the details of construction of the intersection vernier; and Figure 7 is an enlarged sectional view taken along line 7—7 of Figure 4.

Referring to the drawings, and particularly to Figure 1, the trigonometrical device is seen to comprise a generally right-triangular base plate 10, base, altitude and hypotenuse rules 11, 12 and 13 movably mounted on base plate 10, an intersection vernier device 14 adapted to determine the exact point of intersection between altitude rule 12 and hypotenuse rule 13, and a base vernier 15 for determining the position of base rule 11 relative to a zero point. Base plate 10 is preferably formed of a metal such as hardened steel, while the rules 11—13 are formed as strips of a flexible steel or alloy having a low coefficient of expansion. The respective rules 11—13 are provided along the inner portions of their upper surfaces with scales 17, 18 and 19. These three scales correspond to each other, and are preferably in inches each of which is graduated into forty divisions. The graduation with forty divisions to the inch, or .025 inch per division, is preferred for machine shop work since it permits the reading of the device to the third or fourth decimal place.

One edge portion of base plate 10 is formed on its upper surface with a dovetail groove 21 adapted to receive the base rule 11 which is correspondingly dovetailed as illustrated in Figure 3. The thickness of rule 11 is the same as the depth of groove 21, so that the scale 17 will be flush with the upper surface of base plate 10. Scale 17 is employed in conjunction with the base vernier 15 which is formed as a rectangular plate 22 inserted in a corresponding recess 23 in the base plate and held in place by a pair of lock screws or rivets 24 having flush-type end portions. The recess 23 communicates with dovetail groove 21 for the base rule 11, and one edge of plate 22 is beveled to form a continuation of the groove side wall. With such an arrangement, a vernier scale 26 may be provided on the edge of plate 22 which is adjacent and in the same plane as scale 17.

Referring next to the enlarged showing in Figure 2, the vernier scale 26 is graduated with twenty-five divisions in .6 inch, or .024 inch per division. Since the scale 17 for base rule 11 is, as previously stated, graduated with forty divisions to the inch or .025 inch per division, the exact position of base rule 11 relative to the zero point on vernier scale 26 is determined by adding to the reading of scale 17 the number of the vernier division which registers most closely with a division on scale 17. The method of vernier reading will be explained in greater detail in connection with the intersection vernier 14 and with reference to Figure 5.

Referring again to Figure 1, the base and altitude rules 11 and 12 are riveted or integral at 27 and at a perfect right angle relative to each other, the rule 12 being mounted above rule 11 and lying in surface engagement with the base plate. The zero for scale 17 is at the point where the scaled edge of altitude rule 12 overlaps the base rule. The markings of scale 17 then increase to the left, or toward the base vernier 15, until the end of rule 11 is reached, for example at a point ten inches from the altitude rule. Upon sliding of base rule 11 along groove 21, the reading of scale 17 relative to the zero point of base vernier 15 will vary and may be determined accurately, at any desired scale position, through use of vernier 15 as indicated. It is to be noted that the markings of vernier scale 26 also increase to the left as shown in Figure 2.

The zero point for altitude rule 12 is spaced from base rule 11 and lies on a line parallel to the base rule and intersecting the pivot axis 29 for hypotenuse rule 13. Pivot axis 29 is provided adjacent the base vernier 15, and along a line perpendicular to base rule 11 and passing through the zero point of vernier scale 26. As best shown in Figures 2 and 3, the pivotal connection for hypotenuse rule 13, so that it may rotate about axis 29, comprises a flush-type lock screw or rivet 30 extended through base plate 10 and through a rounded boss or ear 31 at the rule end. The ear 31 permits screw or rivet 30 to be so located that the axis 29 is intersected by the extended inner edge 32 of hypotenuse rule 13. The scale 19 of rule 13 has its zero point at pivot axis 29 and is adapted to read the distance from it to the inner edge 33 of altitude rule 12. Scale 18 of the altitude rule, in turn, reads the distance from its zero point to the point of intersection of the edges 32 and 33. Since the zero for scale 18 is offset from base rule 11 the same distance as the zero for hypotenuse scale 19, it follows that the actual triangle being solved has a base extending from axis 29 to the zero for scale 18, and that the base scale 17 is offset from the true triangle base.

A protractor arc 36, having a forty-five degree angle scale 37, is provided on the upper surface of base plate 10 and with its center point at pivot axis 29. The zero point for scale 37 registers with the zero for altitude scale 18, so that the scale 37 will read the angle between the true triangle base and the edge 32 of hypotenuse rule 13.

It is a feature of the invention that the protractor arc 36 is a unit distance from pivot axis 29, preferably ten inches. The sine or tangent of the angle between hypotenuse rule 13 and base rule 11 may then be read without the necessity of any division operation. To read the tangent of an angle to which hypotenuse rule 13 is pivoted, the base rule 11 is set with its ten inch point on the zero of base vernier scale 26, and the reading of altitude scale 18 at its intersection with hypotenuse edge 32 is noted and corrected to the proper decimal place. Thus, with the hypotenuse rule 13 set at 35 degrees as shown in Figure 1, the tangent may be read from scale 18 as approximately .7. To read the sine of an angle, the hypotenuse rule is set as before, and the base and altitude rules 11 and 12 are shifted along groove 21 until the point of intersection of altitude edge 33 and hypotenuse edge 32 lies on protractor arc 36. The reading of altitude scale 18 at the point of intersection, and corrected to the proper decimal place, is then the sine of the angle. Again referring to the setting of Figure 1, it may be seen that the sine of 35 degrees will be approximately .574.

In addition to determining the sine or tangent of an angle, the instrument is, of course, utilized to determine the lengths of various sides of the triangle as well as the included angles. For example, if the lengths of the base and altitude sides are known, the included angle may be determined by setting base rule 11 to the proper point and then reading protractor scale 37 after pivoting hypotenuse rule 13 until it intersects altitude rule 12 at the known altitude. If the length of the base is known and also the included angle, the base rule 11 is set to the proper point, and the hypotenuse rule 13 is pivoted until its edge 32 intersects protractor scale 37 at the known angle. The lengths of sides 12 and 13 may then be determined by reading, respectively, the scales 18 and 19 at the point of intersection of edges 32 and 33. It will be apparent that other types of solutions may be achieved as is necessary or desirable. Any of numerous types of shop problems may be thus solved, with a high degree of accuracy and reliability, with relatively little effort and by persons unused to mathematical computation.

The reading of base scale 17 to the third decimal place is effected by use of the base vernier 15, and the reading of an included angle may be made extremely accurate by dividing scale 37 into a large number of subdivisions. To effect the necessary accurate reading of the intersection point of rule edges 32 and 33, the intersection vernier 14 is provided on one or the other of rules 13 and 12, for example on rule 13 as illustrated in Figures 1 and 4–7. The scales on vernier 14 must be adapted to be flush with scales 19 and 18 which are necessarily at different levels due to the fact that rule 13 overlies rule 12, it being made of flexible material so that it may bend slightly for this purpose.

The intersection vernier 14 comprises a base element or clip 39 adapted to be slid along hypotenuse rule 13 and clamped in various positions, and a sector or angle plate 40 pivotally connected to base clip 39 in such a way that its apex edge 41 is perpendicular to and intersects the rule edge 32. In the illustrated embodiment, an intermediate pivot member 42 is pivoted to base clip 39 and rigidly secured to sector plate 40 to form the pivotal connection.

In the specific construction of the intersection vernier 14, base clip 39 is formed with a body plate 43 underlying and in flatwise engagement witht rule 13, a U-shaped end portion 44 fitted over the edge of rule 13, which is remote from edge 32, and an integral rounded corner portion 46 bent downwardly beneath rule 12 and member 42 to provide the pivot mounting. The upper arm of U-shaped portion 44 is threaded to receive a thumb or set screw 47 adapted to press downwardly against the upper surface of rule 13 and lock base clip 39, and thus the entire intersection vernier 14, in the desired longitudinal position. The integral corner portion 46, which is disposed at the corner of body plate 43 relatively adjacent the high end of hypotenuse scale 19, underlies a similar corner portion 49 of the intermediate pivot member 42, the latter being secured to sector plate 40 as by the screws or rivets 50 shown in Figure 7. The corner portions 46 and 49 of the base clip 39 and pivot member 42 are pivotally connected by a screw or rivet 51 the axis of which passes vertically through edge 32 when base clip 39 is mounted on the hypotenuse rule 13 as shown. As previously indicated, the mounting of sector plate 40 relative to pivot member 42 and base clip 39 is such that its apex edge 41 also passes through the edge 32, that is to say is coincident with the axis of pivot screw 51.

It is important to the desired operation of the intersection vernier 14 that its respective scales be flush with the scales 18 and 19 of rules 12 and 13. To this end the sector plate 40 is formed with a raised horizontal surface or edge 53 in the same plane as the upper surface of hypotenuse rule 13, and with a depressed or recessed surface or edge 54 in the same horizontal plane as the upper surface of altitude rule 12. Surfaces 53 and 54 are separated by a triangular surface 56 at an intermediate level, and meet each other adjacent apex 41 at a vertical surface 57 lying along a bisectrix of the angle defined by raised and depressed surfaces 53 and 54. The surfaces 53 and 54 are provided, respectively, with vernier scales 59 and 60 which are the same as the vernier scale 26 of base vernier 15, that is to say are formed with twenty-five divisions and with .024 inch per division. The zeros of the vernier scales 59 and 60 are at their ends remote from apex 41.

The intersection vernier is operated by forcing the apex edge 41 against the overlapping rule edges 32 and 33, then pivoting the sector plate 40 about pivot screw 51 to abut the scale 60 with scale 18 as shown in Figure 4. Thereafter, the sector plate is pivoted until scale 59 abuts scale 19 as shown in Figure 5. In the former instance, the length of the altitude of the triangle is determined, while in the latter instance the length of its hypotenuse is read. Where the length of the hypotenuse is one of the known factors, the thumb screw 47 is loosened and the intersection vernier 14 slid along rule 13 until the apex 41 is at the known point, after which the screw is tightened to lock the vernier in position. Thereafter, the hypotenuse rule is pivoted, or the altitude rule adjusted laterally, until the apex 41 abuts edge 33 of the altitude rule. Sector plate 40 is then pivoted to the position shown in Figure 4 and a reading is taken on altitude scale 18.

Referring to Figure 5, the use of all of the vernier scales will be illustrated in connection with the scale 59 which abuts, and is in the same plane as, the scale 19 of hypotenuse rule 13. It will be observed that the apex 41 abuts hypotenuse scale 19 at a point which is greater than 12.2 inches but is less than 12.225 inches, each subdivision on scale 19 being .025 inch as previously stated. Assuming that the subdivision numbered 20 on scale 59 registers most closely with a subdivision mark on scale 19, .020 inch is added to the 12.2 reading to give a final reading of 12.220 inches. After it is thus determined that the hypotenuse is 12.220 inches long, sector plate 40 is pivoted to the position shown in Figure 4 and an altitude reading is taken in the identical manner.

To briefly summarize the operation of the trigonometrical device, any right triangle may be solved by setting the known sides on the rule scales 17—19, or the known angle with reference to the protractor scale 37. In addition, the sine or tangent of an angle may be determined by taking a reading on altitude scale 18 either when it intersects hypotenuse rule 13 at protractor arc 36, in the case of a sine, or when base scale 17 reads 10 inches in the case of a tangent. The reading of base scale 17 is determined with reference to base vernier 15, and that of altitude scale 18 and hypotenuse scale 19 with reference to intersection vernier 14. The intersection vernier 14 may be slid along hypotenuse rule 13 by merely loosening and resetting thumb screw 47, and may be pivoted about its pivot screw 51 so that it registers either with the altitude or hypotenuse scales as shown in Figures 4 and 5.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A vernier device adapted to determine the exact point of intersection of the edges of two overlapping rules, said edges being provided with corresponding scales, which comprises a base slidable along one of said rules, means to lock said base at selected longitudinal positions on said one rule, an angle plate, means to pivotally connect said angle plate and base to permit pivoting of said angle plate about its own apex edge, said apex edge being adapted to at all times abut the scaled edge of said one rule and to selectively abut the scaled edge of the other of said rules, and vernier scales provided, respectively, along the side edges of said angle plate.

2. The invention as claimed in claim 1, wherein said angle plate is formed with upper surface portions at different elevations and having said vernier scales thereon, said upper surface portions being, respectively, in the same planes as the scaled rule surfaces with which said vernier scales are adapted to cooperate.

3. The invention as claimed in claim 1, in which the common zero point for said vernier scales is at said apex edge, and in which the scale markings on said rule edges diminish from said apex edge to the wide portion of said angle plate.

4. In a trigonometrical device; a base plate; a base rule mounted on said base plate for longitudinal sliding movement along a fixed path; an altitude rule provided on one end of said base rule and at a right angle thereto; a hypotenuse rule pivotally connected to said base plate at a point adjacent said base rule, said hypotenuse rule being of sufficient length to lap relative to said altitude rule and form a right triangle; and an intersection vernier adapted to determine the exact point of lapping of said hypotenuse and altitude rules, said vernier comprising a base slidably mounted on one of said hypotenuse and altitude rules, and an angle member pivotally connected to said base and having vernier scale means along its side edges, the apex edge of said angle member lying along the pivot axis therefor and being adapted to simultaneously abut the lapped side edges of said hypotenuse and altitude rules.

5. A trigonometrical device comprising a metal base plate having a dovetail groove therein, a metal base rule slidably mounted in said groove in dovetail relation and having its outer surface flush with the surface of said base plate, a metal altitude rule mounted perpendicularly over said base rule and in surface engagement with said base plate, a metal hypotenuse rule pivotally connected to said base plate at a point spaced from said base rule, corresponding scale means provided on the inner edge portions of said rules, the scale means on said hypotenuse rule having its zero point at the pivot axis for said hypotenuse rule, the scale means on said altitude rule having its zero point lying on a line parallel to said base rule and passing through said pivot axis, and the scale means on said base rule having its zero point at the intersection of the inner edge of said altitude rule and said base rule, and an intersection vernier provided on one of said hypotenuse and altitude rules for sliding movement relative thereto, said vernier having an apex edge adapted to abut the overlapping inner edges of said hypotenuse and altitude rules, and being pivotable about said apex edge to permit a reading with the scale means on said altitude rule and on said hypotenuse rule.

References Cited in the file of this patent

UNITED STATES PATENTS

| | | |
|---|---|---|
| 989,806 | Robertson et al. | Apr. 18, 1911 |
| 1,678,019 | Oates | July 24, 1928 |
| 1,965,017 | Wellington | July 3, 1934 |
| 2,605,960 | Lores | Aug. 5, 1952 |